United States Patent [19]

Wakabayashi et al.

[11] Patent Number: 5,614,980
[45] Date of Patent: Mar. 25, 1997

[54] DISPLAY DEVICE INCLUDING A POINTER

[75] Inventors: Hiroshi Wakabayashi; Daiki Tsukahara, both of Kanagawa-ken, Japan

[73] Assignee: Nikon Corporation, Tokyo, Japan

[21] Appl. No.: 511,897

[22] Filed: Aug. 7, 1995

[30]　　Foreign Application Priority Data

Sep. 2, 1994　[JP]　Japan .................................. 6-209454

[51] Int. Cl.⁶ .................................................. G03B 17/18
[52] U.S. Cl. ......................................... 396/147; 396/294
[58] Field of Search .............................. 354/409, 289.12, 354/470

[56]　　　　　References Cited

U.S. PATENT DOCUMENTS 3,611,893  10/1971  Starp ........................ 354/443
4,101,911   7/1978  Maitani et al. ................. 354/470
5,365,292  11/1994  Wakabayashi et al. ........... 354/76

FOREIGN PATENT DOCUMENTS 5-150307  6/1993  Japan .

*Primary Examiner*—Safet Metjahic
*Assistant Examiner*—D. P. Malley
*Attorney, Agent, or Firm*—Oliff & Berridge

[57]　　　　　ABSTRACT

A display device including a display not enabled condition of a measured value if the measured value is outside the scale range of the display equipment is disclosed. A pointer is driven according to the operation of an operation device during a setting value display mode, while the pointer is driven to a measured value during a measured value display mode. If the measured value is outside the scale range during the measured value display mode, the pointer 65 is driven to the scale position indicating the display not enabled condition.

14 Claims, 10 Drawing Sheets

5,614,980

DISPLAY DEVICE INCLUDING A POINTER

BACKGROUND OF THE INVENTION

1. Field of the Invention

The present invention relates to a display device that uses a pointer.

2. Description of Related Art

A display device that displays various physical quantities using a pointer which is driven to rotate on a scale board by a power driving source is disclosed by Japanese Unexamined Patent Publication Hei 5-150307.

In displaying certain physical quantities on a display device, it is quite often desired to display the setting value and the measured value for the physical quantity. For example, in a display device that displays the object distance for a camera, the setting value of the object distance is displayed on the display equipment when the manual focus adjustment mode is enabled and focus adjustment of the phototaking lens is executed by a operation member, and when the autofocus adjustment mode is enabled the object distance measured by the distance measuring device is displayed and focus adjustment of the phototaking lens is executed automatically based on the object distance.

However, while problems do not occur in displaying the measured value of certain physical quantities if the measured value stays within the scale range of the display equipment, once the measured value exceeds or is less than the scale range the pointer points to the maximum scale or to the minimum scale respectively; hence the problem arises of determining whether the pointer is displaying the correct measured value or whether the measured value is outside the scale range.

SUMMARY OF THE INVENTION

An object of the present invention is to provide a display device which displays the measured value display not enabled condition once the measured value is outside the scale range of the display equipment.

In order to achieve the above-stated objective, the present invention may include a display unit to display a physical quantity with a pointer that is driven on a scale board; a driving device to drive the pointer; an operation device to change the display value of the display unit; a measurement device to measure the physical quantity; a switching device to switch between the setting value display mode and the measured value display mode; and a control device that makes the measurement range for the measurement device larger than the display range in the setting value display mode and that drives the pointer by the driving device according to the operation of the operation device if the switching device switches to the setting value display mode, but which drives the pointer by the driving device to a measured value by the measurement device if the switching device switches to the measurement value display mode, wherein a not enabled scale position is provided on the scale board outside of the display range in the setting value display mode, and wherein the control device drives the pointer by the driving device to the not enabled scale position when value measured by the measured device in the measured value display mode is outside the display range in the setting value display mode.

In the present invention, the control device may switch to the setting value display mode when the value measured by the measurement device in the measured value display mode is outside the display range in the setting value display mode.

The display unit of the display device of the present invention may display the object distance of a camera and, if the operation device is operated during the manual focus adjustment mode, the switching device switches to the setting value display mode while the control device rotates the pointer by a predetermined angle per a predetermined amount of operation of the operation device and, if a release button is half-depressed during the autofocus adjustment mode, the switching device switches to the measured value display mode and the control device rotates the pointer to the object distance measured by a distance measurement device.

The present invention may include a display unit to display a physical quantity with a pointer that is driven on a scale board; a driving device to drive the pointer; an operation device to change the display value of the display device; a computation device to compute the physical quantity; a switching device to switch between the setting value display mode and the computed value display mode; and a control device that makes the measurement range for the measurement device larger than the display range in the setting value display mode and that drives the pointer by the driving means according to the operation of the operation device when the switching means switches to the setting value display mode, but that drives the pointer by the driving device to the value computed by the computation device when the switching means switches to the computation value display mode, wherein a scale is provided to show the display not enabled condition for a computed value on the scale board, and wherein the control means drives the pointer by the driving device to the scale showing the display not enabled condition when the value computed by the computation device is outside the scale range in the computed value display mode.

In the display device of the present invention, the control device may switch to the setting value display mode when the value computed by the computation device in the computed value display mode is outside the display range in the setting value display mode.

The display unit of the display device according to the present invention may display the diaphragm value of the camera and, when the operation device is operated during the diaphragm priority auto exposure mode, the switching device switches to the setting value display mode while the control device drives the pointer by a predetermined amount per predetermined operation amount of the operation device, wherein if a release button is half-depressed during the programmed auto exposure mode, the switching device switches to the computed value display mode and the computation device computes the diaphragm value based on the object illuminance measured by a photometry device, and the control device drives the pointer to the diaphragm value computed.

In the setting value display mode, the pointer is driven in response to operation by the operation device, while in the measured value display mode, the pointer is driven to the measured value. If the measured value is outside the scale range in the measured value display mode, the pointer is driven to the scale showing the display not enabled condition.

For example, in displaying the object distance of a camera, the setting value for the object distance is displayed by switching to the setting display mode and by driving the pointer in response to the operation of the operation device during the manual focus adjustment mode. Moreover, if the release button is half-depressed during the autofocus adjustment mode, the measured value of the object distance is displayed by driving the pointer to the object distance measured by the distance measuring device after switching to the measured value display mode. If the measured value of the object distance is outside the scale range during the measured value display mode, the pointer is driven to the scale position indicating the display not enabled condition.

By this procedure, the measured value display not enabled condition during the measured value display mode is indicated.

Here, if switching to the setting value display mode is accomplished automatically when the measured value is outside the scale range during the measured value display mode, the display mode switching operation becomes unnecessary and operability improves. For example, in displaying the object distance of a camera, even if the measured value of the object distance becomes the display not enabled condition, the object distance can be established immediately by hand, hence phototaking can take place without missing a chance to click the shutter.

Moreover, the pointer is driven in response to the operation of the operation device in the setting value display mode, while the pointer is driven to the computed value in the computed value display mode. If the computed value is outside the scale range in the computed value display mode, the pointer is driven to the scale position indicating the display not enabled condition.

For example, in displaying the diaphragm value of the camera, the setting value for the diaphragm is displayed by switching to the setting display mode with the operation of the operation device and by driving the pointer in response to the operation of the operation device during the diaphragm priority auto exposure mode. Moreover, half-depressing the release button during the program auto exposure mode causes a switch to the computed value display mode, and the diaphragm value is computed based on the object illuminance measured by a photometry device, and the pointer is driven to the diaphragm value. If the computed diaphragm value is outside the scale range during the computed value display mode, the pointer is driven to the scale indicating the display not enabled condition.

By this procedure, the computed value display not enabled condition during the computed value display mode is indicated.

In this instance, if switching to the setting value display mode is accomplished automatically when the computed value exceeds the scale range during the computed value display mode, the display mode switching operation becomes unnecessary and operability improves. For example, in displaying the diaphragm value of the camera, even if the computed diaphragm value produces the display not enabled condition, the diaphragm value can be established immediately by hand, hence phototaking can take place without missing a chance to click the shutter.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
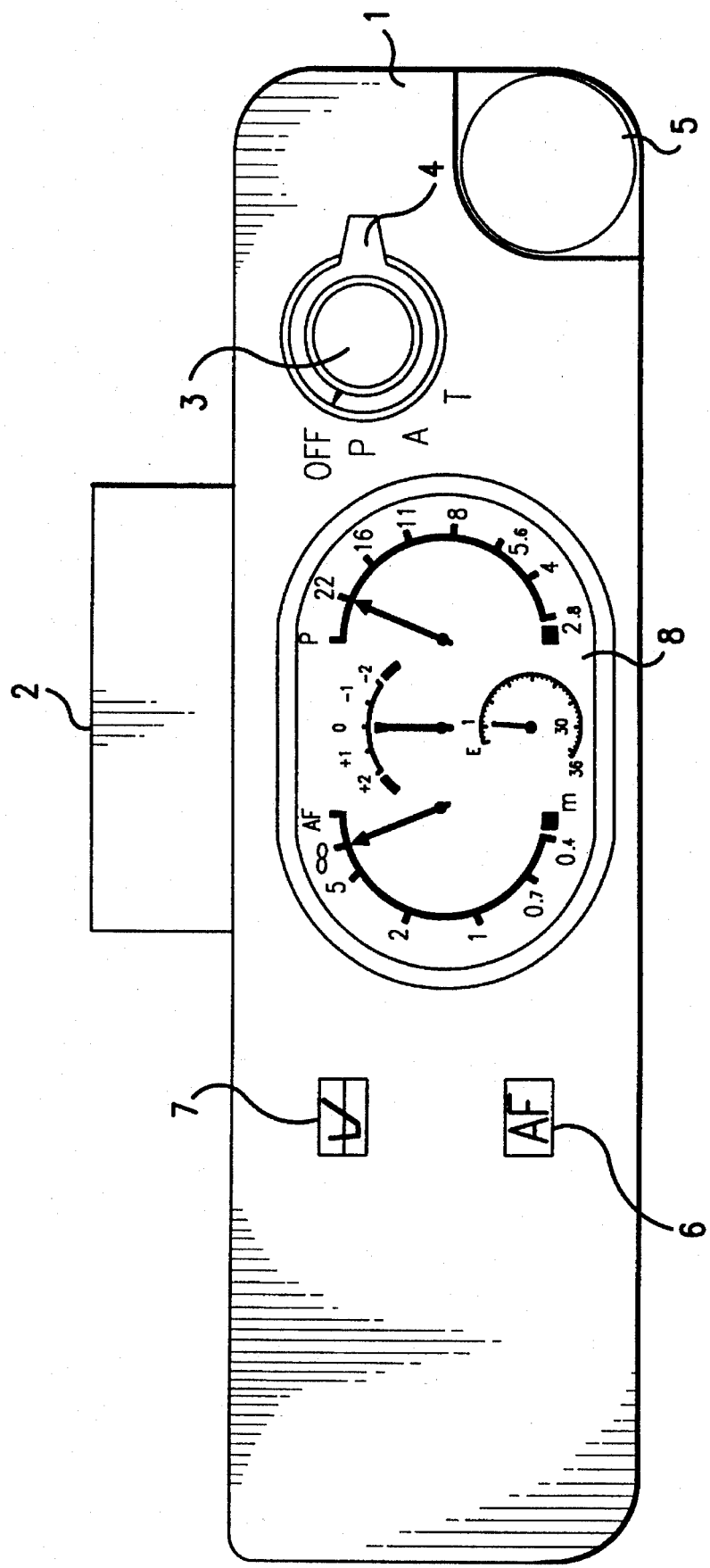
FIG. 1 is a top view of a camera including a device according to the present invention.

FIG. 1 is a top view of a camera including a display device according to the present invention.

A phototaking lens barrel 2 is mounted on a camera body 1. On top of the camera body a release button 3, a mode selector 4, a command dial 5, an autofocus (AF) mode button 6, an exposure correction mode button 7, display equipment 8, and the like, are provided.

The mode selector 4 is a selector to choose a program auto exposure mode P (hereafter P-AE mode) which automatically establishes exposure according to a predetermine program line diagram, a diaphragm priority auto exposure mode A, a shutter speed priority auto exposure mode T, and a stop mode OFF to stop various operations of the camera.

The command dial 5 is a dial to switch the diaphragm, the exposure correction value, the shutter speed, and the like. When the command dial 5 is turned while the AF mode button 6 is pressed, an object distance from infinity to the close distance of 0.4 m can be established in the autofocus adjustment mode (hereafter AF mode) and the manual focus adjustment mode (hereinafter MF mode). Moreover, when the command dial 5 is turned while the exposure correction mode button 7 is pressed, the exposure correction value can be established between the range of +2 to −2. The display equipment 8 comprises four rotating pointer-type display units—a phototaking frame number display unit, an exposure correction display unit, a phototaking distance display unit, and a diaphragm display unit.

Figure 2:
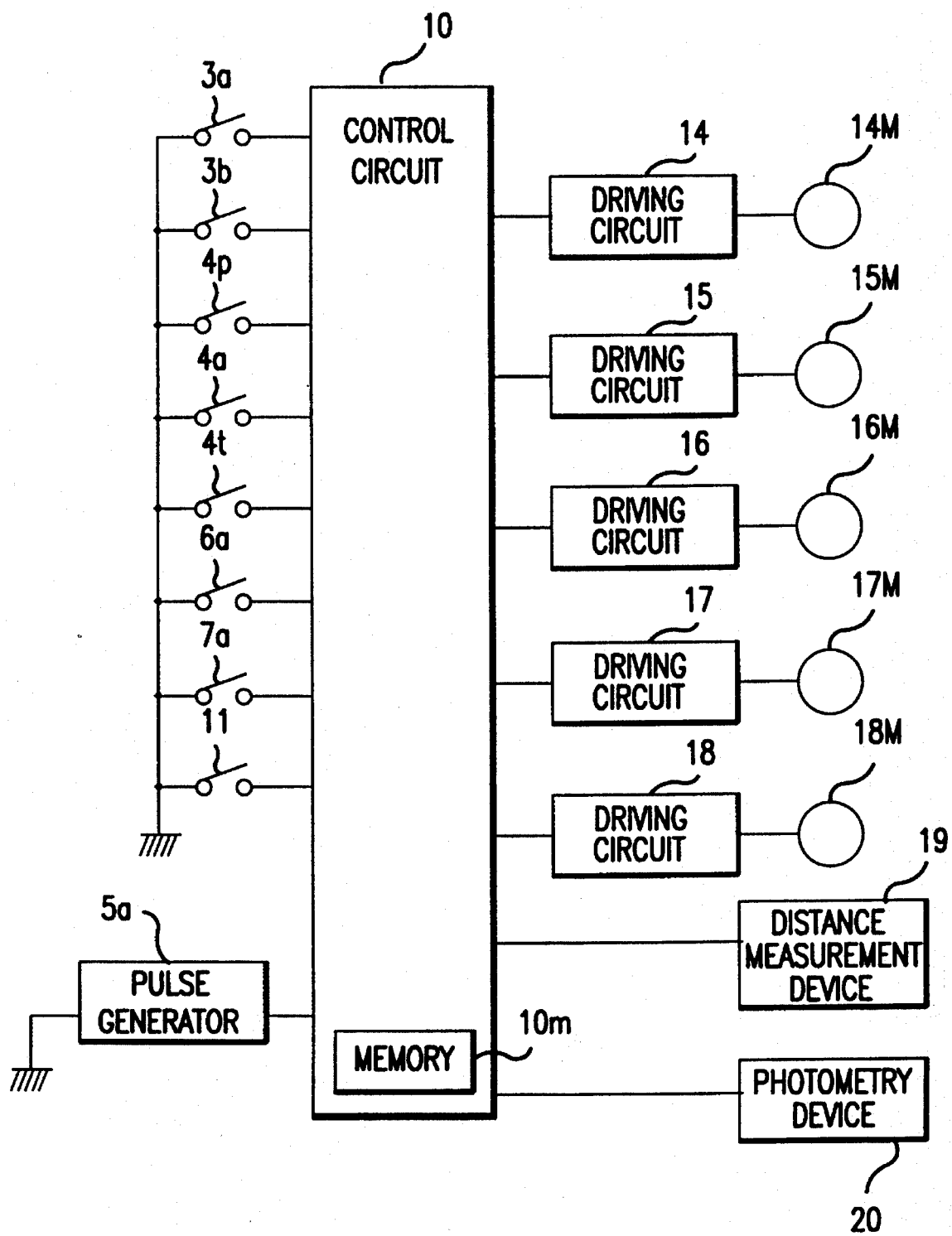
FIG. 2 is a block diagram of the structure of an embodiment of the present invention.

FIG. 2 is a block diagram of the structure of an embodiment of the present invention. A control circuit 10 includes peripheral parts such as a microcomputer and a nonvolatile memory (EEPROM) 10m and performs sequence control for a camera and various algorithms as well as display control by executing a control program, to be explained later.

Other control devices may also be used as a controller for various operations. A controller may be implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 5–10 can be used as the controller. A distributed processing architecture is preferred for maximum data/signal processing capability and speed.

Switches 3a and 3b turn on and off by interlocking with a release button 3, with switch 3a turning on when the release button 3 is half-depressed, and switch 3b turning on when the release button 3 is fully-depressed. Switches 4p, 4a, and 4t turn on and off by interlocking with a mode selector 4, with switch 4p turning on when the mode selector is positioned at P, and switch 4a turning on when the mode selector is positioned at A, and switch 4t turning on when the mode selector is positioned at T. Moreover, a switch 6a turns on when the AF mode button 6 is pressed, switch 7a turns on when the exposure correction mode button 7 is pressed, and a switch 11 turns on when the battery chamber lid is opened. These switches are connected to the control circuit 10.

Moreover, a pulse generator 5a, which generates pulses according to the direction of rotation of the command dial 5, and a driving circuit 14, that drives a film feeding motor 14M, are connected to the control circuit 10. Furthermore, step motors 15M–18M rotationally drive each pointer of the four display units of display equipment 8 (see FIG. 3) to which the respective driving circuits 15–18 are connected. The step motor 15M rotationally drives the pointer of the phototaking frame number display unit, and the step motor 16M rotationally drives the pointer of the exposure correction display unit. Furthermore, the step motor 17M rotationally drives the pointer of the object distance display unit, and the step motor 18M rotationally drives the pointer of the diaphragm display unit. A distance measurement device 19 detects and outputs the distance to the object to the control circuit 10. Moreover, a photometry device 20 detects the illuminance of the object and outputs a photometry value to the control circuit 10.

Figure 3:
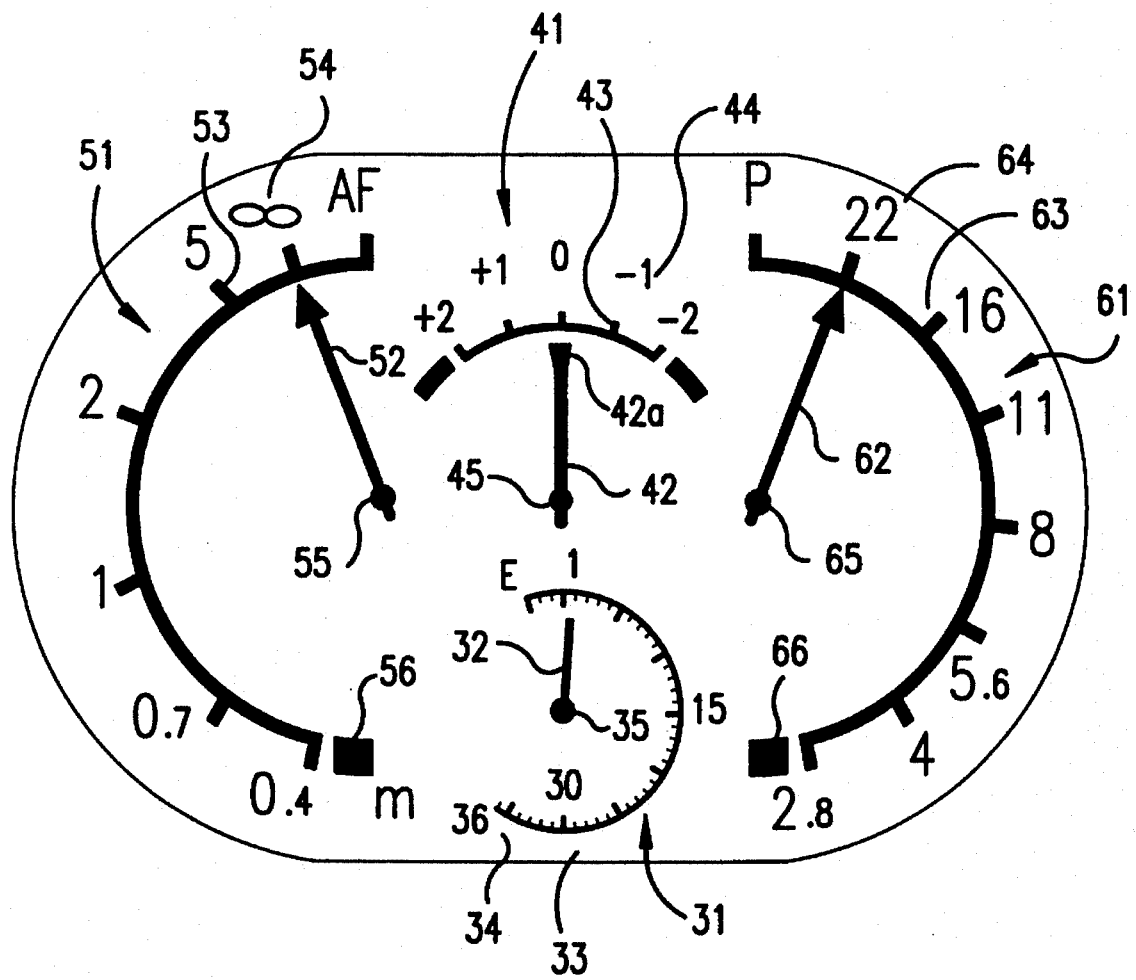
FIG. 3 is an enlarged diagram of the display equipment of an embodiment of the present invention.

FIG. 3 is an enlarged diagram of the display equipment 8.

A phototaking frame display unit 31, including a pointer 32, a scale board 33, and an index 34 indicating the representative frame number, displays the number of frames of the film for which shooting is completed. The pointer 32 has an axis of rotation 35.

Each time film is fed by the film feeding motor 14M, the control circuit 10 rotationally drives the pointer 32 by a step motor 15M according to the amount of feeding and, at the same time, it adds the current driving amount to the sum of the driving amount Θ1 through the previous time stored in the memory 10m and stores the latest driving amount Θ1 of the pointer 32.

The exposure correction display unit 41, including a pointer 42, a scale board 43, and an index 44 indicating the exposure correction value, displays the exposure correction value. The pointer 42 has an axis of rotation 45. In this instance, the tip 42a of the pointer 42 is formed in a circular arc shape with the center at the axis of rotation 45.

When a pulse signal from the pulse generator 5a is input while the switch 7a is turned on, the control circuit 10 rotationally drives the pointer 42 by the step motor 16M according to the polarity indicating input pulse number and the direction of rotation. In other words, the pointer is driven one scale unit (about 18 degrees) per input pulse.

At the same time, the control circuit 10 adds the current driving amount to the sum of the driving amount Θ2 through the previous time stored in the memory 10m and stores the latest driving amount Θ2 of the pointer 42.

The object distance display unit 51, including a pointer 52, a scale board 53, and an index 54 indicating the representative distance and the AF mode, displays the object distance. The pointer 52 has an axis of rotation 55. In this instance, the symbol ∞ indicates infinity.

When a pulse signal from the pulse generator 5a is input while the switch 6a is turned on, the control circuit 10 rotationally drives the pointer 52 by the step motor 17M according to the polarity indicating input pulse number and the direction of rotation. In other words, the pointer is driven one scale unit per input pulse. For example, in order to change from the AF mode to 5 m of the MF mode, the command dial should be rotated the equivalent of 2 pulses while the AF mode button 6 is pressed, then the pointer will rotate from the AF position to the 5 m position. At the same time, the control circuit 10 adds the current driving amount to the sum of the driving amount Θ3 through the previous time stored in the memory 10m and stores the latest driving amount Θ3 of the pointer 52.

Figure 4:
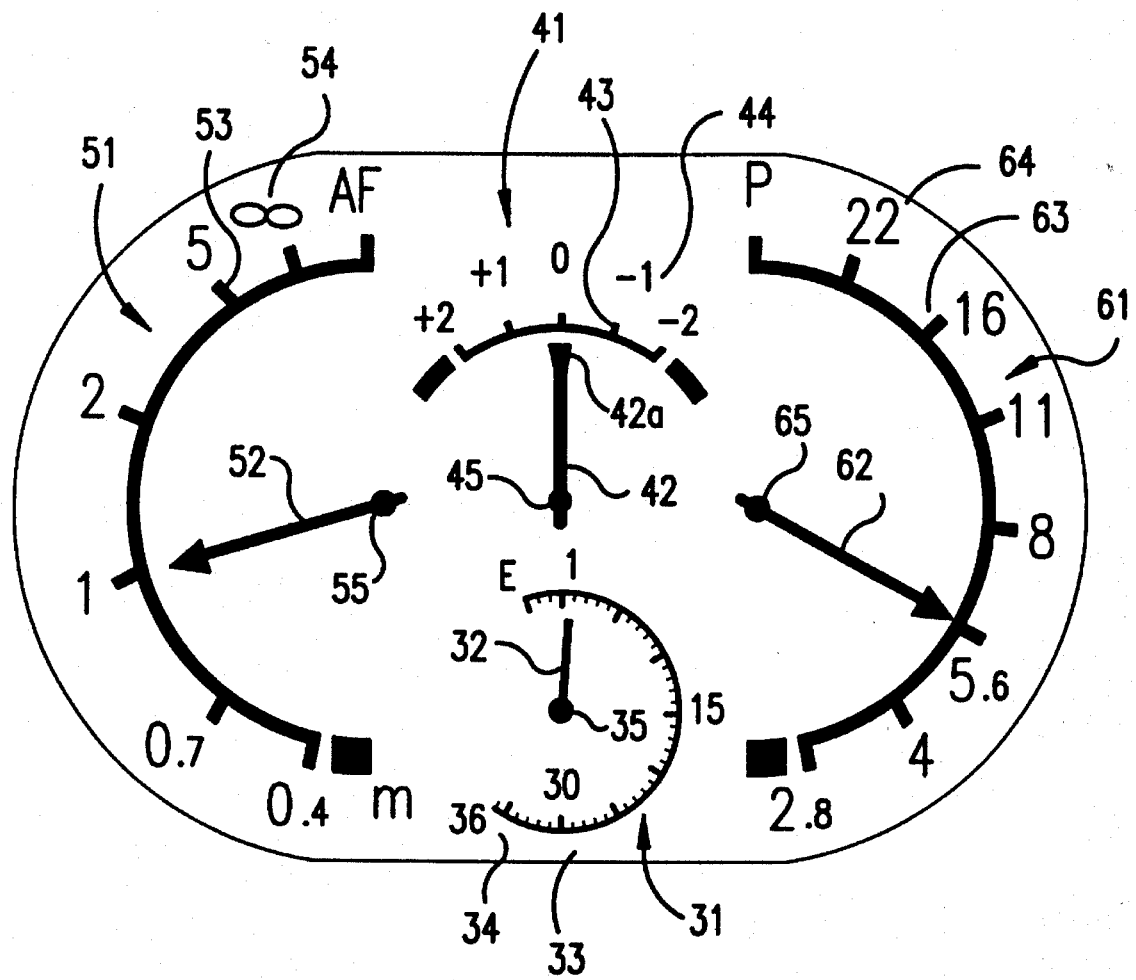
FIG. 4 is a drawing of a first example of a display by the display equipment of FIG. 3.

On the other hand, when the switch 3a turns on by half-depression of the release button 3 with the pointer at the AF position, that is to say, with the AF mode being established, the control circuit 10 rotationally drives the pointer 52 to the position of the object distance detected by the distance measurement device 19. For example, if the object distance of 1 m is detected by the distance measurement device 19, the pointer 52 is rotated to the scale 1 m as shown in FIG. 4. In this instance, if the object distance detected by the distance measurement device 19 is smaller than 0.4 m, the pointer 52 points to the scale 56 indicating the display not enabled condition of the measured value.

The diaphragm display unit 61, including a pointer 62, a scale board 63, and an index 64 indicating the diaphragm value and the P-AE mode, displays the diaphragm value. The pointer 62 has an axis of rotation 65.

When a pulse signal from the pulse generator 5a is input while the switch 4a is turned on, the control circuit 10 rotationally drives the pointer 62 by the step motor 18M according to the polarity indicating input pulse number and the direction of rotation. In other words, the pointer is driven one scale unit per input pulse. For example, in order to establish a diaphragm value of F16 by changing the exposure mode from the program auto exposure mode P to the diaphragm priority automatic exposure mode A, the command dial 5 should be rotated the equivalent of 2 pulses after the mode selector is set to the A position, then the pointer 62 will rotate from the position P to the position 16. At the same time, the control circuit 10 adds the current driving amount to the sum of the driving amount Θ4 through the previous time stored in the memory 10m and stores the latest driving amount Θ4 of the pointer 62.

On the other hand, when the switch 3a turns on by half-depression of the release button 3 with the mode selector 4 at the P position, that is to say, with the program automatic exposure mode P being established, the control circuit 10 obtains a diaphragm value based on the object illuminance detected by the photometry device 20 and the program line diagram pre-established and stored in the memory 10m, and rotationally drives the pointer 62 to the diaphragm value. For example, if a diaphragm value of 5.6 is obtained based on the object illuminance detected by the photometry device 20 and the program line diagram, the pointer 62 is rotated to the scale 5.6 m, as described in FIG. 4. In this instance, if the diaphragm value computed is outside the range between F2.8 and F22, the pointer 62 points to the scale 66 indicating the display not enabled condition of the measured value.

Figure 5:
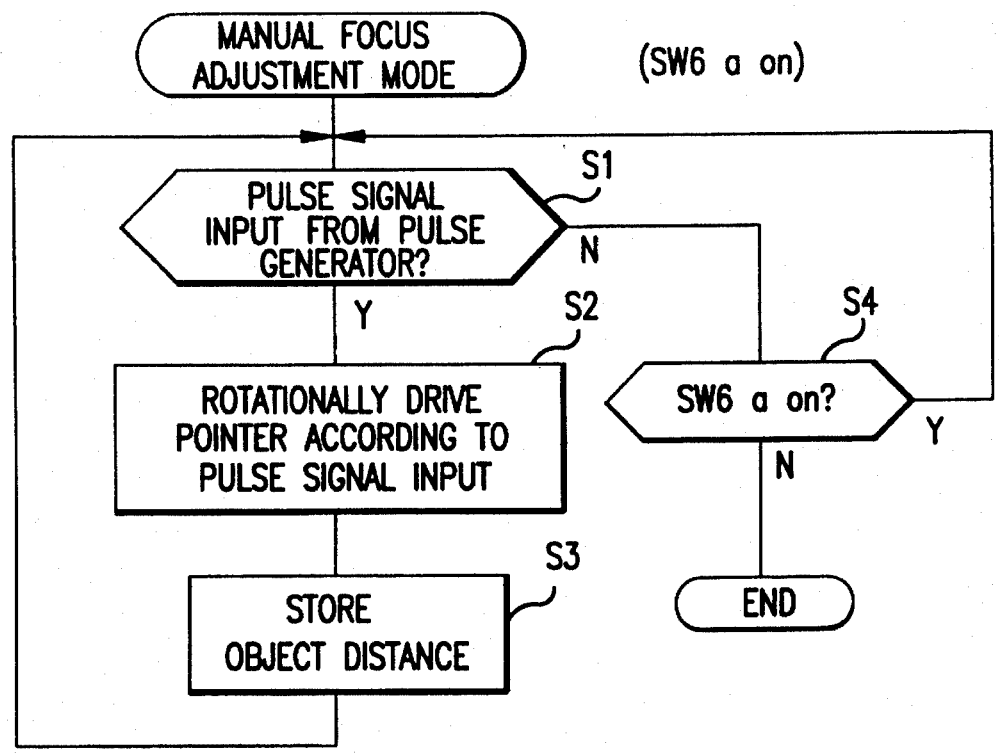
FIG. 5 is a flow chart of a process routine of the manual focus adjustment mode.

FIG. 5 is a flow chart of the process routine of the manual focus adjustment mode. The microcomputer in the control circuit 10 starts the execution routine when the AF mode button 6 is operated, and the switch 6a turns on. At step S1, a determination is made as to whether a pulse signal from the pulse generator 5a has been input with the rotation operation of the command dial 5 and, if a pulse signal has been input, the program moves to step S2, otherwise the program moves to step S4. As described above, the pulse generator 5a outputs pulse signals matching the direction and the amount of rotation of the command dial 5. At step S2, the pointer 52 is rotationally driven according to the pulse signal input from the pulse generator 5a, and the setting value of the object distance during the manual focus adjustment mode is displayed on the object distance display unit 51. At the next step, S3, the object distance established manually by the command dial 5 is memorized, then the program moves to step S1. On the other hand, if a pulse signal has not been input at step S1, a determination is made as to whether the AF mode button 6 has been operated by the switch 6a. If the AF mode button 6 has been operated, the program returns to S1, otherwise execution of the program is completed.

Figure 6:
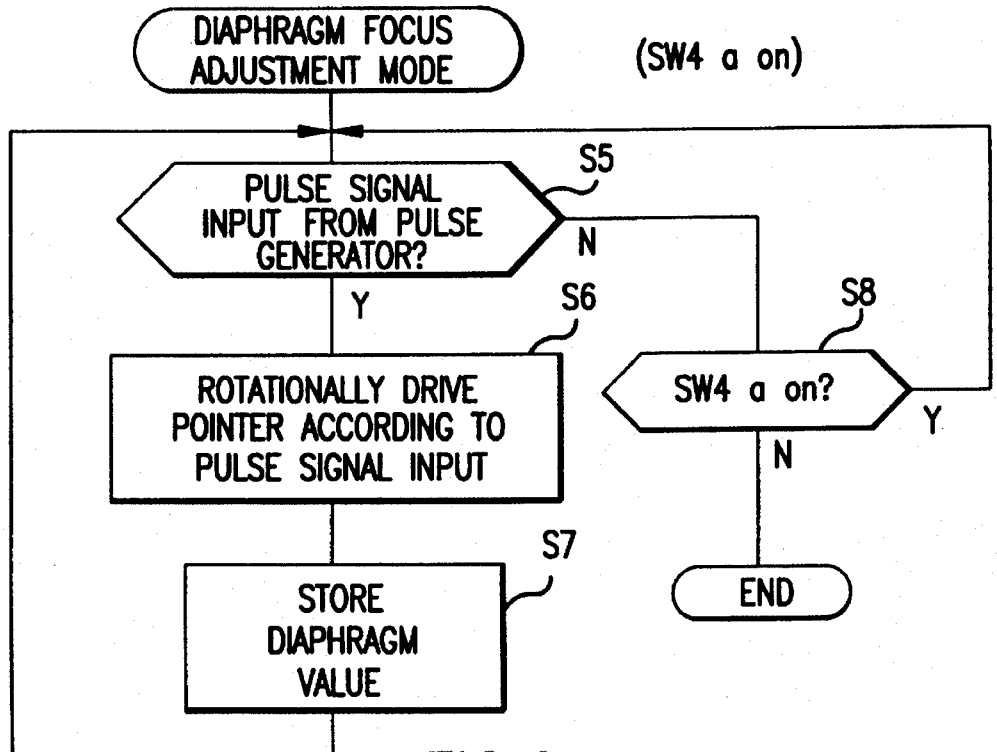
FIG. 6 is a flow chart of a process routine of the diaphragm priority auto exposure mode.

FIG. 6 is a flow chart describing the process routine of the diaphragm priority exposure mode. The microcomputer in the control circuit 10 starts the execution routine when the mode selector 4 is set to the diaphragm priority automatic exposure mode A, and the switch 4a turns on. At step S5, a determination is made as to whether a pulse signal from the pulse generator 5a has been input with the rotation operation of the command dial 5 and, if a pulse signal has been input, the program moves to step S6, otherwise the program moves to step S8. At step S6, the pointer 62 is rotationally driven according to the pulse signal input from the pulse generator 5a, and the setting value of the diaphragm setting value during the diaphragm priority automatic exposure mode is displayed on the diaphragm display unit 61. At the next step, S7, the diaphragm value is memorized, and the program returns to step S1. On the other hand, if a pulse signal has not been input at step S5, a determination is made as to whether the mode selector 4 establishes the diaphragm priority automatic exposure mode A by switch at step S8. If the diaphragm priority automatic exposure mode A is established, the program returns to S5, otherwise execution of the program is completed.

Figure 7:
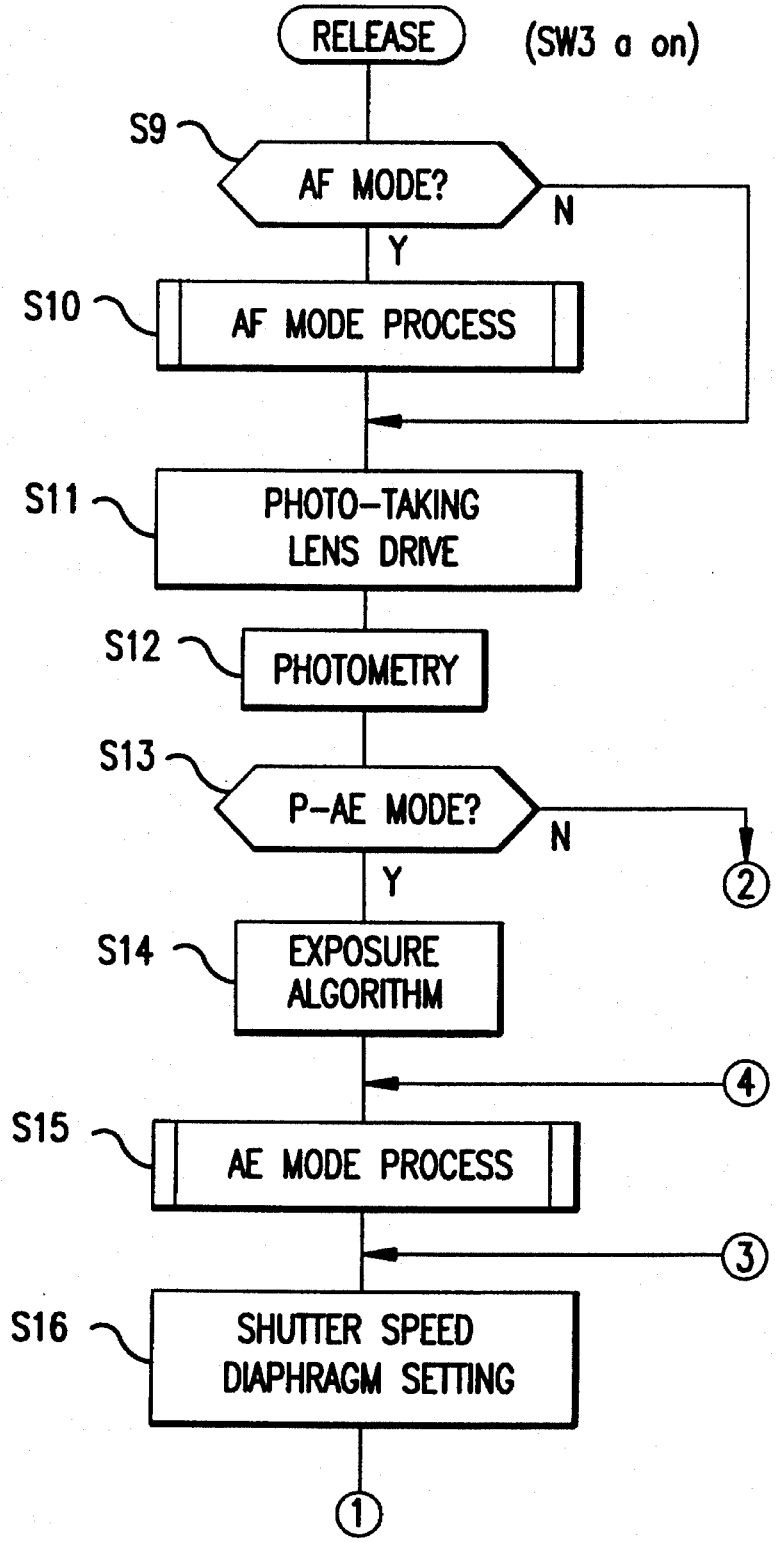
FIG. 7 is a flow chart of a release routine.
Figure 8A:
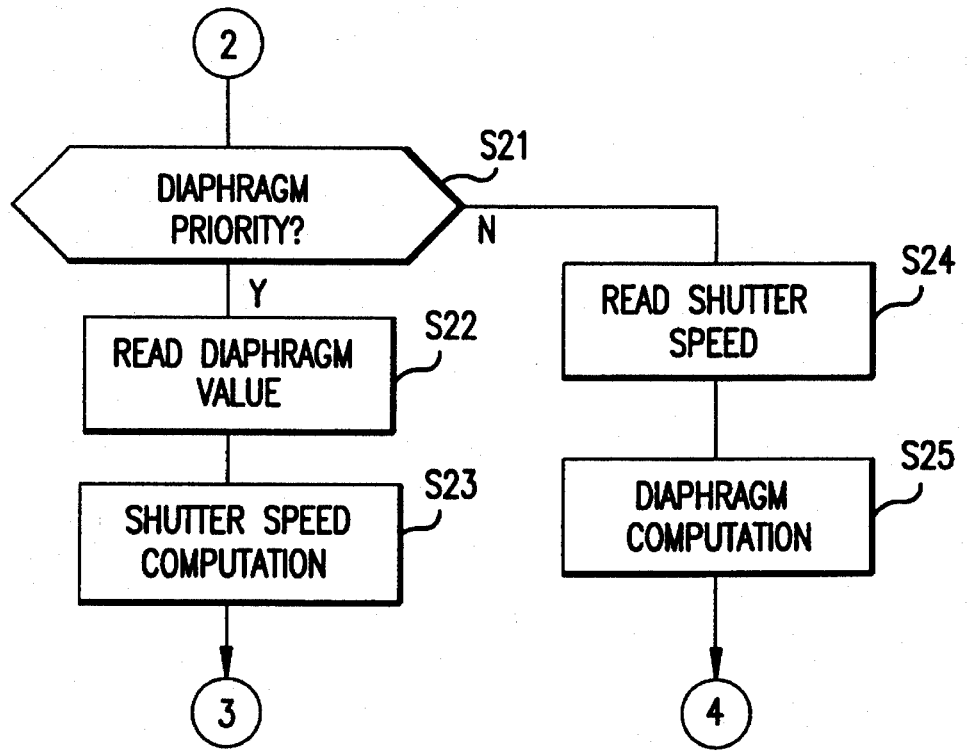
FIG. 8(a) and FIG. 8(b) are flow charts of the release routine continuing from FIG. 7.
Figure 8B:
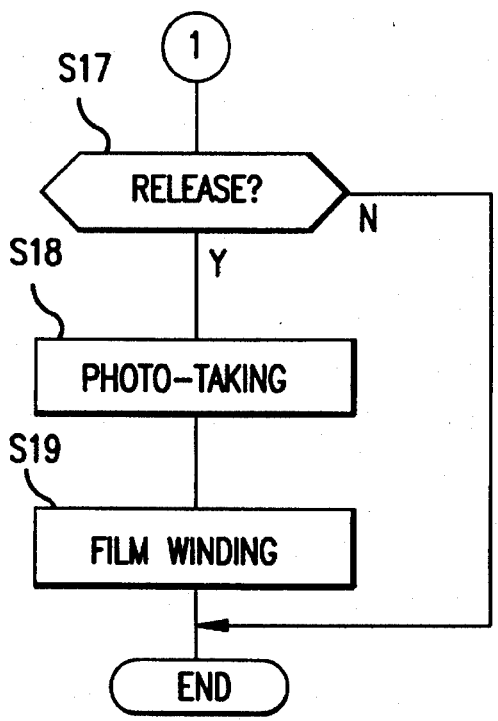

FIG. 7 and FIGS. 8(a) and 8(b) are flow charts that describe the release routine. The microcomputer in the control circuit 10 starts the execution routine when the switch 3a turns on with the half-depression of the release button 3. At step S9, a determination is made as to whether the pointer 52 of the object distance display unit 51 is positioned at AF and the AF mode is established, and if the AF mode is established the program moves to step S10. Otherwise the program determines that the MF mode is established and moves to step S11.

If the AF mode is established, the AF mode process routine, to be explained later, is executed at step S10. Next, at step S11, an unrepresented phototaking lens motor and a motor driving circuit are controlled, and the phototaking lens is driven to a position equivalent to the object distance established by the MF mode or to a position equivalent to the object distance detected by the distance measuring device 19.

At step S12, the object illuminance is detected by the photometry device 20, and the program moves to step S13 where a determination is made as to whether the P-AE mode has been established by the mode selector 4. If the P-AE mode has been established, the program moves to step S14 where the exposure algorithm is performed based on the object illuminance detected by the photometry device 20 and the pre-established program line diagram, and the shutter speed and the diaphragm value are computed. At step S15, the AE mode process routine, to be explained later, is executed.

If the P-AE mode is determined not to have been established at step S13, the program moves to step S21 where a determination is made as to whether the diaphragm priority automatic exposure mode A has been established and the switch 4a is turned on. If the diaphragm priority automatic exposure mode A has been established, the program moves to step S22 where the diaphragm value memorized in the memory 10m is read by conducting the process routine of the diaphragm priority auto exposure mode described in FIG. 6. At the next step, S23, the shutter speed is computed based on the diaphragm value read from the memory 10m, the object illuminance detected by the photometry device, and the program line diagram.

Moreover, if the diaphragm priority auto exposure mode A is determined not to have been established at step S21, the program determines that the shutter speed priority auto exposure mode T is established and moves to step S24. At step S24, the process routine of an unrepresented shutter speed priority auto exposure mode T is executed, and the shutter speed stored in the memory 10m is read. Then the program moves to step S25. At step S25, the diaphragm value is computed based on the shutter speed read from the memory 10m, the object illuminance detected by the photometry device 20, and the program line diagram, and the program returns to step S15 and executes the AE mode process routine, to be explained later.

Once the shutter speed and the diaphragm value are determined in the exposure mode, the shutter speed and the diaphragm value determined are established in an unrepresented shutter control unit and diaphragm control unit, and the program moves to step S17. At step S17, a determination is made as to whether the release button 3 is fully-depressed and the switch 3b is turned on, and if the release button 3 is fully-depressed the program moves to step S18. Otherwise execution of the program is completed.

At step S18, the phototaking operation is executed by an unrepresented shutter control unit, diaphragm control unit, and the like, and at the next step, S19, the driving circuit 14 is controlled and the film is wound by the film feeding motor 14M.

Figure 9:
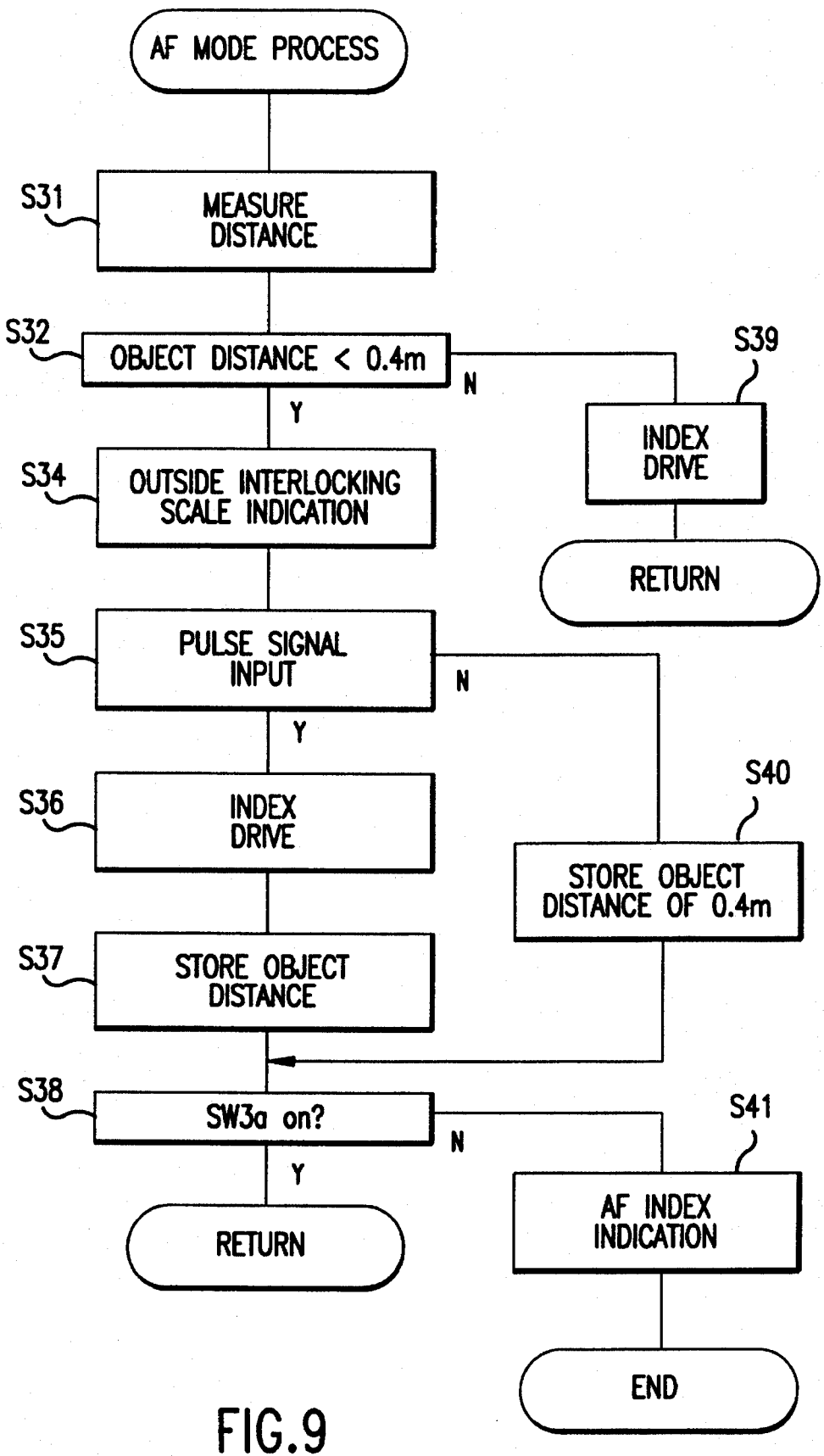
FIG. 9 is a flow chart of an autofocus (AF) mode process routine.

FIG. 9 is a flow chart of the AF mode process routine. At step S31, the distance measurement device 19 measures the distance, and at the next step, S32, a determination is made as to whether the measured object distance is less than 0.4 m. If the object distance is less than 0.4 m, that is, if the measured value of the object distance is outside of the scale range, the program moves to step S34 and the pointer 52 is rotationally driven to point to the scale position 56 indicating the display not enabled condition of the measured value.

Moreover, at step S35, a determination is made as to whether a pulse signal has been input from the pulse generator 5a with the rotation operation of the command dial 5, and if a pulse signal has been input, the program moves to S36 where the pointer 52 is rotationally driven according to the input signals. For example, if two pulse signals are input from the pulse generator 5a in the clockwise direction, the pointer 52 which points to the scale 56 indicating the display not enabled condition of the measured value is rotationally-driven to the index of 0.7 m, as shown in FIG. 12. At step S37, the object distance established by the command dial 5 is stored in the memory 10m. On the other hand, if a pulse signal from the pulse generator 5a has not been input at step S35, the object distance of 0.4 m is stored in the memory 10m, and the program moves to step S38. At step S38, a determination is made as to whether the release button 3 is half-depressed by the switch 3a and, if it is half depressed, the program returns to step S11 in FIG. 7, otherwise the program moves to S41. At step S41, the pointer 52 is rotationally driven to indicate the AF index. If the object distance is determined to be more than 0.4 m, that is, if the measured value of the object distance is in the scale range at step S32, the program returns to step S11 in FIG. 7 after rotationally driving the pointer 52 to the object distance measured at step S39.

Figure 10:
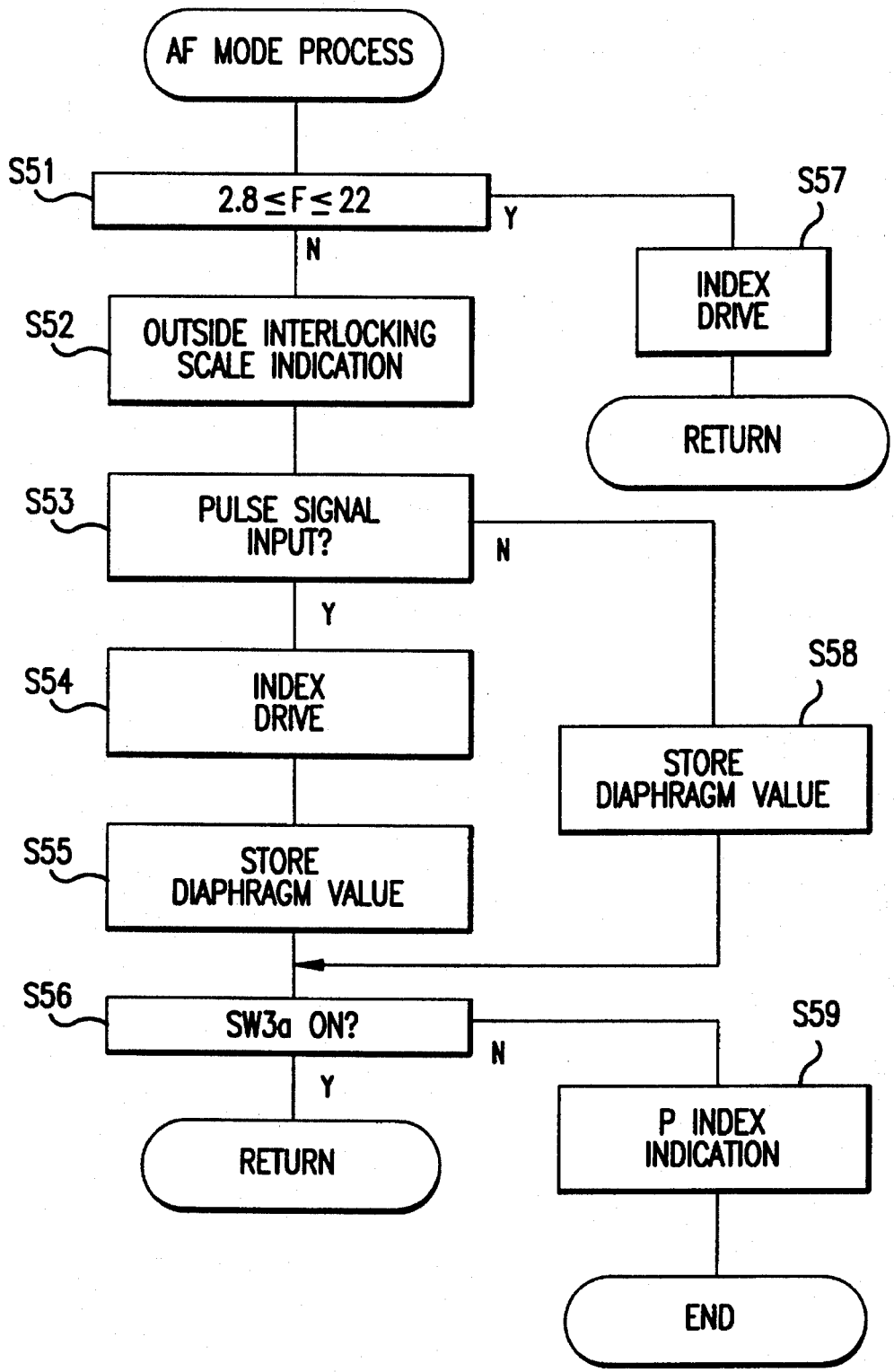
FIG. 10 is a flow chart of an automatic exposure (AE) mode process routine.
Figure 11:
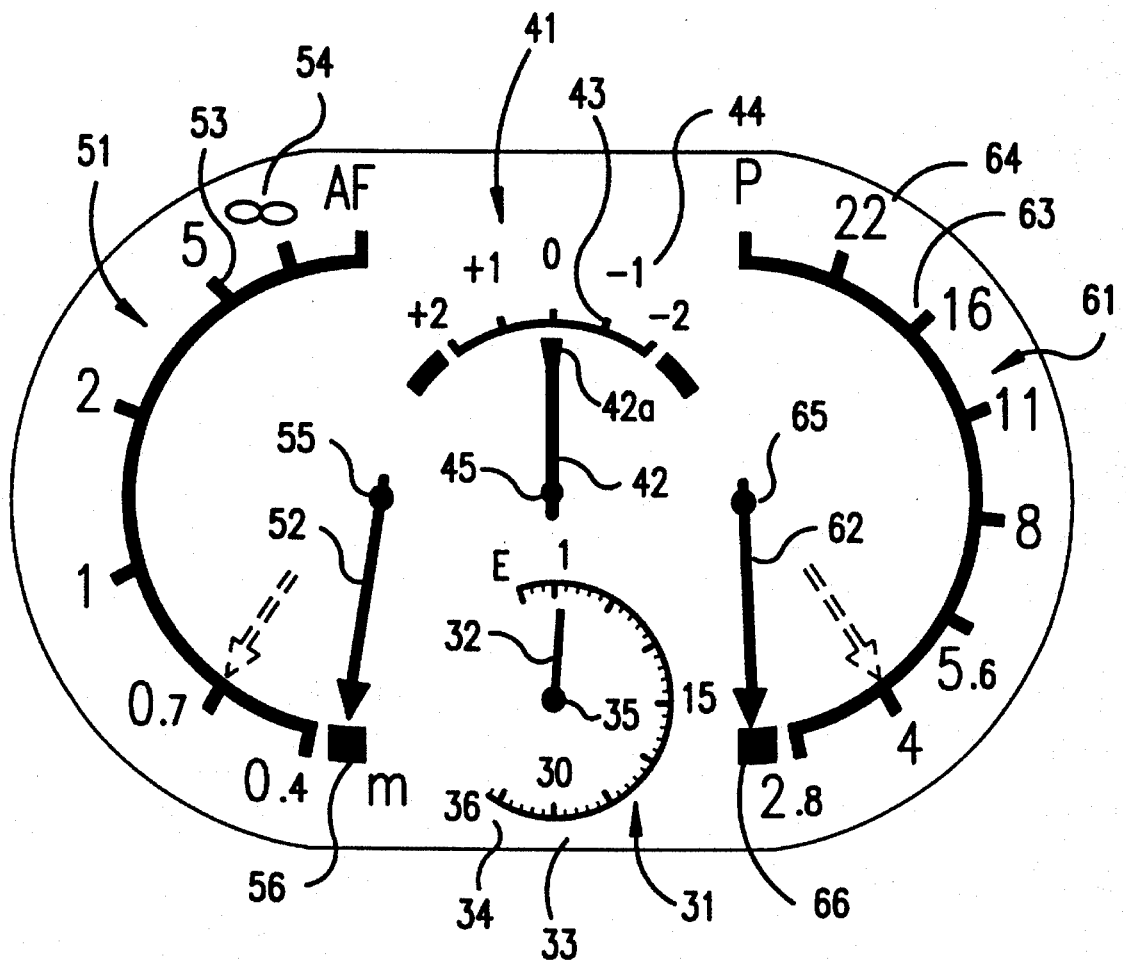
FIG. 11 is a drawing of a second example of a display by the display equipment of FIG. 3.

FIG. 10 is a flow chart that shows the AE mode process routine.

At step S51, a determination is made as to whether the diaphragm value computed is in the range of F2.8 to F22 and, if it is not in the range, the program moves to step S52, otherwise the program moves to step S57. At step S52, the pointer 62 is rotationally driven to point to the scale 66 indicating the display not enabled condition of the computed value. Moreover, at step S53, a determination is made as to whether a pulse signal has been input from the pulse generator 5a with the rotation operation of the command dial 5 and, if a pulse signal has been input, the program moves to step S54 where the pointer 52 is rotationally driven according to the input signals. For example, if two pulse signals are input from the pulse generator 5a in the counterclockwise direction, the pointer 62 pointing to the scale 66 indicating the display not enabled condition of the computed value is rotationally driven to the index of F4, as described in FIG. 12. At step S55, the diaphragm value established by the command dial 5 is stored in the memory 10m. On the other hand, if a pulse signal from the pulse generator 5a has not been input at step S53, a diaphragm value of F2.8 is stored in the memory 10m and the program moves to step S56. At step S56, a determination is made as to whether the release button 3 is half-depressed by the switch 3a and, if it is half-depressed, the program returns to step S16 in FIG. 7. Otherwise the program moves to step S59. At step S59, the pointer 62 is rotationally driven to indicate the P index. if the computed diaphragm value is determined to be in the scale range, the program returns to step S16 in FIG. 7 after rotationally driving the pointer 52 to the diaphragm value computed at step S57.

In this instance, in the above embodiment, an example is described in which the present invention is applied to the display equipment of a camera, but the present invention is not limited to the display equipment of a camera and can also be applied to the display equipment of an air conditioner and the like with a temperature sensor.

Moreover, in the above embodiment, an example is described in which the display device comprises a pointer that is rotationally driven on the scale board, but the present invention is not limited to a display device that rotationally drives a pointer.

In the structure of the above embodiment, the object distance display unit 51 and the diaphragm display unit 61 comprise display means; the driving circuits 17, 18 and the step motors 17M and 18M comprise driving means; the command dial 5 comprises operation means; the mode selector 4, the AF mode button 6, and the control circuit 10 comprise switching means; and the control circuit 10 comprise control means.

As explained above, in the present invention, if the measured value is outside the scale range in the measured value display mode, the pointer is made to be driven to the scale indicating the display not enabled condition; hence the display not enabled condition of the measured value in the measured value display mode is made known. Moreover, if the measured value is outside the scale range in the measured value display mode, the display mode is switched to the setting value display mode; hence operation to switch display modes becomes unnecessary and operability is improved.

Moreover, according to the present invention, if the computed value is outside the scale range in the computed value display mode, the pointer is made to be driven to the scale indicating the display not enabled condition; hence the display not enabled condition of the computed value in the computed value display mode is indicated. Moreover, if the computed value is outside the scale range in the computed value display mode, the display mode is switched to the setting value display mode; hence operation to switch display modes becomes unnecessary and operability is improved.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A display device comprising:

a display unit to display a physical quantity, said display unit including a scale board and a pointer that is driven on said scale board;

a driving device to drive said pointer;

an operation device to change the pointer display value of said display unit;

a measurement device to measure said physical quantity;

a switching device to switch between a setting value display mode and a measured value display mode; and a control device that makes a measurement range for said measurement device larger than a display range in said setting value display mode and that controls said driving device to drive said pointer according to the operation of said operation device in said setting value display mode, and that controls said driving device to drive said pointer to a value measured by said measurement device in said measured value display mode, wherein a scale position to indicate when measurement indication is not enabled is provided on said scale board outside of a display range in said setting value display mode and said control device controls said driving device to drive said pointer to said not enabled scale position when a measured value is outside said display range, wherein said control device automatically switches from the measured value display mode to said setting value display mode upon receiving a measured value outside said display range.

2. The display device of claim 1, further comprising a release button movable to a half-depressed position, wherein a said display unit displays a distance to an object in focus, and, if said operation device is operated during a manual focus adjustment mode, said switching device switches to said setting value display mode so that said control device controls said driving device to rotate said pointer by a predetermined angle based on a predetermined amount of operation of said operation device, and, if said release button is half-depressed during an autofocus adjustment mode, said switching device switches to said measured value display mode so that said control device controls said driving device to rotate said pointer to indicate said distance.

3. A display device comprising:

a display unit to display a physical quantity, said display unit including a scale board and a pointer that is driven on said scale board;

a driving device to drive said pointer;

an operation device to change the pointer display value of said display unit;

a computation device to compute said physical quantity;

a switching device to switch between a setting value display mode and a computed value display mode; and a control device that makes a computation range for said computation device larger than a display range in said setting value display mode and that controls said driving device to drive said pointer according to the operation of said operation device in said setting value display mode, and that controls said driving device to drive said pointer to a value computed by said computation device in said computed value display mode, wherein a scale position to indicate when computation indication is not enabled is provided on said scale board outside of a display range in said setting value display mode and said control device controls said driving device to drive said pointer to said not enabled scale position when said computed value is outside said display range, wherein said control device switches from the computed value display mode to said setting value display mode when the value computed by said computation device in said computed value display mode is outside said display range.

4. The display device of claim 3, in combination with a camera further comprising:

a photometry device;

a mode selector device to select between at least a diaphragm priority auto exposure mode and a programmed auto exposure mode; and a release button movable to a half-depressed position, wherein said display unit displays a diaphragm value of said camera, and, if said operation device is operated during said diaphragm priority auto exposure mode, said switching device switches to said setting value display mode so that said control device controls said driving device to drive said pointer by a predetermined amount of operation of said operation device, and, if said release button is half-depressed during said programmed auto exposure mode, said switching device switches to said computed value display mode so that said computation device computes a diaphragm value based on object illumination measured by said photometry device and said control device controls said driving device to drive said pointer to said computed diaphragm value.

5. The display device of claim 4, wherein said release button is movable to a full depressed positioned for execution of a phototaking operation.

6. A display device comprising:

display means for displaying a physical quantity, said display means including a scale board and a pointer that is driven on said scale board;

driving means for driving said pointer;

operation means for changing the pointer display value of said display means;

measurement means for measuring said physical quantity;

switching means device for switching between a setting value display mode and a measured value display mode; and control means for making a measurement range for said measurement means larger than a display range in said setting value display mode and for controlling said driving means to drive said pointer according to the operation of said operation means in said setting value display mode, and for controlling said driving means to drive said pointer to a value measured by said measurement means when said switching means switches to said measured value display mode, wherein a scale position to indicate when measurement is not enabled is provided on said scale board outside of a display range in said setting value display mode and said control means controls said driving means to drive said pointer to said not enabled scale position when a measured value exceeds said display range, wherein said control means automatically switches from the measured value display mode to said setting value display mode upon receiving a measured value outside said display range from said measurement means.

7. The display device of claim 6, further comprising a release button movable to a half-depressed position, wherein said display unit displays a distance to an object in focus, and, if said operation means is operated during a manual focus adjustment mode, said switching means switches to said setting value display mode so that said control means controls said driving device to rotate said pointer by a predetermined angle based on a predetermined amount of operation of said operation means, and, if said release button is half-depressed during an autofocus adjustment mode, said switching device switches to said measured value display mode so that said control means controls said driving means to rotate said pointer to indicate said distance.

8. A display device comprising:

display means for displaying a physical quantity, said display means including a scale board and a pointer that is driven on said scale board;

driving means for driving said pointer;

operation means for changing the pointer display value of said display unit;

computation means for computing said physical quantity;

switching means for switching between a setting value display mode and a computed value display mode; and control means for making a computation range for said computation means larger than a display range in said setting value display mode and for controlling said driving means to drive said pointer according to the operation of said operation means in said setting value display mode, and for controlling said driving means to drive said pointer to a value computed by said computation means in said computed value display mode, wherein a scale position to indicate when computation indication is not enabled is provided on said scale board outside of a display range in said setting value display mode and said control means controls said driving means to drive said pointer to said not enabled scale position when a computed value is outside said display range, wherein said control means automatically switches from the measured value display mode to said setting value display mode when the value computed by said computation means in said computed value display mode is outside said display range.

9. The display device of claim 8, in combination with a camera further comprising:

photometry means;

mode selector means for selecting between at least a diaphragm priority auto exposure mode and a programmed auto exposure mode; and a release button movable to a half-depressed position, wherein said display means displays a diaphragm value of said camera, and, if said operation means is operated during said diaphragm priority auto exposure mode, said switching means switches to said setting value display mode so that said control means controls said driving means to drive said pointer by a predetermined amount of operation of said operation means, and, if said release button is half-depressed during said programmed auto exposure mode, said switching means switches to said computed value display mode so that said computation means computes a diaphragm value based on object illumination measured by said photometry means and said control means controls said driving means to drive said pointer to said computed diaphragm value.

10. The display device of claim 8, wherein said release button is movable to a full depressed position for execution of a phototaking operation.

11. A method of operating a display device to display a physical quantity on a scale board with a pointer that is driven on said scale board, comprising the steps of:

driving said pointer;

changing the display value of said pointer display device by operation of an operation device;

measuring said physical quantity;

switching between a setting value display mode and a measured value display mode;

making a measurement range larger than a display range in said setting value display mode and controlling said driving of said pointer according to the operation of said operation device in said setting value display mode;

controlling said driving of said pointer to a measured value of said physical quantity in said measured value display mode, wherein a scale position to indicate when measurement indication is not enabled is provided on said scale board outside of a display range in said setting value display mode;

controlling said driving of said pointer to said not enabled scale position when a measured value is outside said display range; and switching to said setting value display mode when the value measured in said measured value display mode is outside said display range.

12. The method of claim 11, further comprising the steps of:

moving a release button to a half-depressed position, wherein said display device displays a distance to an object in focus, and operating said operation device during a manual focus adjustment mode to switch to said setting value display mode and control said driving to rotate said pointer by a predetermined angle based on a predetermined amount of operation of said operation device; and moving said release button to a half-depressed position during an autofocus adjustment mode to switch to said measured value display mode to control said driving to rotate said pointer to indicate said distance.

13. A method of operating a display device to display a physical quantity on a scale board with a pointer that is driven on said scale board, comprising the steps of:

driving said pointer;

computing said physical quantity;

changing the display value of said display device by operation of an operation device;

switching between a setting value display mode and a computed value display mode;

making a computation range larger than a display range in said setting value display mode and controlling said driving of said pointer according to the operation of said operation device in said setting value display mode;

controlling said driving of said pointer to a computed value in said computed value display mode, wherein a scale position to indicate when computation indication is not enabled is provided on said scale board outside of a display range in said setting value display mode;

controlling said driving means to drive said pointer to said not enabled scale position when a computed value is outside said display range; and switching to said setting value display mode when the value computed in said computed value display mode is outside said display range.

14. The method of claim 13, further comprising the steps of:

switching between at least a diaphragm priority auto exposure mode and a programmed auto exposure mode;

moving a release button to a half-depressed position, wherein said display means displays a diaphragm value of a camera, and operating said operation device during said diaphragm priority auto exposure mode to switch to said setting value display mode to control said driving of said pointer by a predetermined amount of operation of said operation device;

half-depressing said release button during said programmed auto exposure mode to switch to said computed value display mode;

computing a diaphragm value based on object illumination measured by a photometry device; and controlling said driving of said pointer to said computed diaphragm value.

* * * * *